United States Patent
Konya et al.

(10) Patent No.: US 12,407,015 B2
(45) Date of Patent: Sep. 2, 2025

(54) METHOD FOR PRODUCING SOLID ELECTROLYTE POWDER, AND METHOD FOR PRODUCING ALL SOLID STATE BATTERY

(71) Applicant: MITSUBISHI GAS CHEMICAL COMPANY, INC., Tokyo (JP)

(72) Inventors: Masashi Konya, Niigata (JP); Kazuki Tamai, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 66 days.

(21) Appl. No.: 18/285,421

(22) PCT Filed: Mar. 23, 2022

(86) PCT No.: PCT/JP2022/013406
§ 371 (c)(1),
(2) Date: Oct. 3, 2023

(87) PCT Pub. No.: WO2022/215519
PCT Pub. Date: Oct. 13, 2022

(65) Prior Publication Data
US 2024/0194936 A1 Jun. 13, 2024

(30) Foreign Application Priority Data

Apr. 7, 2021 (JP) .................................. 2021-065249

(51) Int. Cl.
*H01M 10/0562* (2010.01)
*C01G 19/00* (2006.01)
*H01M 10/0525* (2010.01)

(52) U.S. Cl.
CPC ...... *H01M 10/0562* (2013.01); *C01G 19/006* (2013.01); *H01M 10/0525* (2013.01); *C01P 2004/61* (2013.01); *C01P 2006/40* (2013.01); *H01M 2300/0068* (2013.01)

(58) Field of Classification Search
CPC .......... H01M 10/0562; H01M 10/0525; C01G 19/006; C01P 2004/61
See application file for complete search history.

(56) References Cited

U.S. PATENT DOCUMENTS

| 2014/0315098 A1* | 10/2014 | Inoue ................ H01M 10/0562 429/304 |
| 2024/0234798 A1 | 7/2024 | Konya et al. |

FOREIGN PATENT DOCUMENTS

| EP | 4 321 485 A1 | 2/2024 |
| JP | 10-287674 A | 10/1998 |
| JP | 2008-4459 A | 1/2008 |
| JP | 2008-27890 A | 2/2008 |
| JP | 2009-170412 A | 7/2009 |
| JP | 2020-27781 A | 2/2020 |
| JP | 2020-87794 A | 6/2020 |
| WO | 2012/176266 A1 | 12/2012 |

OTHER PUBLICATIONS

Extended European Search Report dated Apr. 10, 2025, issued in European family member EPO application No. 22784504.7.
International Search Report issued May 31, 2022 in International Bureau of Wipo Patent Application No. PCT/JP2022/013406 with an English translation thereof.
Written Opinion issued May 31, 2022 in International Bureau of Wipo Patent Application No. PCT/JP2022/013406 with an English translation thereof.

* cited by examiner

*Primary Examiner* — Nathan T Leong
(74) *Attorney, Agent, or Firm* — GREENBLUM & BERNSTEIN, P.L.C.

(57) ABSTRACT

A method for producing a solid electrolyte powder includes preparing a mixed solution by adding a poor solvent to a good solvent solution that contains a good solvent and a solid electrolyte that contains an alkali metal element and/or an alkaline earth metal element, Sn and S; removing at least some of the good solvent from the mixed solution to precipitate solid electrolyte particles; and drying the solid electrolyte particles to obtain a solid electrolyte powder. The ratio of the volume of the poor solvent relative to the volume of the good solvent (volume of poor solvent/volume of good solvent) is 5 or more.

14 Claims, No Drawings

METHOD FOR PRODUCING SOLID ELECTROLYTE POWDER, AND METHOD FOR PRODUCING ALL SOLID STATE BATTERY

TECHNICAL FIELD

The present invention relates to a method for producing a solid electrolyte powder and a method for producing an all-solid-state battery.

BACKGROUND ART

Conventionally, non-aqueous electrolyte secondary batteries have been widely used in applications including portable information terminals and portable electronic equipments. For electrolytes to be used for non-aqueous electrolyte secondary batteries, a flammable organic solvent is usually used as an electrolytic solution. For this reason, non-aqueous electrolyte secondary batteries have a strong exterior so that an organic solvent does not leak out, and usually have a function against a risk at the time when an electrolytic solution leaks out. Thus, there is a limitation on structures of devices.

Moreover, recently, the range of applications of non-aqueous electrolyte secondary batteries has been widened to movable bodies such as electric vehicles, hybrid electric vehicles and aircrafts, stationary power storage systems, etc., and high-capacity non-aqueous electrolyte secondary batteries are desired. For high-capacity non-aqueous electrolyte secondary batteries, higher safety is desired.

Under the above-described circumstances, attention has been given to non-aqueous electrolyte secondary batteries obtained by using a solid electrolyte, in which no flammable organic solvent is used, and which can realize high safety.

In non-aqueous electrolyte secondary batteries obtained by using a solid electrolyte, in general, the interface resistance between an electrolyte layer and an electrode layer is relatively high when compared to the case of using an electrolytic solution. Therefore, conventionally, methods for reducing the interface resistance between an electrolyte layer and an electrode layer have been examined.

For example, Patent Document 1 describes an invention related to sulfide-based solid electrolyte fine particles, which contain a sulfur element, a lithium element and a phosphorus element as main components, and which have an average particle diameter of 0.1 to 10 µm.

Patent Document 1 describes that thinning of an electrolyte layer and reduction in the interface resistance between an electrolyte layer and an electrode agent can be expected by microparticulating a solid electrolyte.

Further, as methods for producing the aforementioned sulfide-based solid electrolyte fine particles, Patent Document 1 describes: a method for multi-stage pulverization of sulfide-based solid electrolyte coarse particles in a non-aqueous solvent; a method for single-stage pulverization of sulfide-based solid electrolyte coarse particles in a non-aqueous solvent to which a dispersion stabilizer is added; and a method for dry pulverization of sulfide-based solid electrolyte coarse particles using a jet pulverizer.

By the way, as solid electrolytes, sulfide-based solid electrolytes and oxide-based solid electrolytes are known. Among them, special attention has been recently given to tin (Sn)-containing sulfide-based solid electrolytes because they exhibit high ionic conductivity and high water resistance.

PRIOR ART DOCUMENTS

Patent Documents

Patent Document 1: JP 2008-4459A

SUMMARY OF THE INVENTION

Problems to be Solved by the Invention

According to the method described in Patent Document 1, a sulfide-based solid electrolyte can be microparticulated by means of pulverization. However, it was found that there is a case where a tin (Sn)-containing sulfide-based solid electrolyte is decomposed by energy at the time of pulverization. Accordingly, a method for producing a microparticulated tin (Sn)-containing sulfide-based solid electrolyte has been desired.

Means for Solving the Problems

The present inventors diligently made researches in order to solve the above-described problem. As a result, it was found that the above-described problem can be solved by a method of using a good solvent and a poor solvent relative to a tin (Sn)-containing sulfide-based solid electrolyte, and thus the present invention was achieved.

Specifically, the present invention includes, for example, aspects described below.

[1] A method for producing a solid electrolyte powder, which comprises:
  a step (1) for preparing a mixed solution by adding a poor solvent to a good solvent solution that comprises a good solvent and a solid electrolyte that comprises an alkali metal element and/or an alkaline earth metal element, Sn and S;
  a step (2) for removing at least some of the good solvent from the mixed solution to precipitate solid electrolyte particles; and
  a step (3) for drying the solid electrolyte particles to obtain a solid electrolyte powder,
  wherein the ratio of the volume of the poor solvent relative to the volume of the good solvent (volume of poor solvent/volume of good solvent) is 5 or more.

[2] The method according to item [1], wherein the solid electrolyte comprises at least one of Li and Na.

[3] The method according to item [1] or [2], wherein the solid electrolyte is a solid electrolyte formed of Li, Sn and S.

[4] The method according to any one of items [1] to [3], wherein the good solvent comprises an alcohol solvent.

[5] The method according to any one of items [1] to [4], wherein the poor solvent comprises at least one of nitrile solvents and ester solvents.

[6] The method according to any one of items [1] to [5], wherein the solid electrolyte powder has an average particle diameter of 20 µm or less.

[7] A method for producing an all-solid-state battery, which comprises a step for layering a positive electrode layer, a negative electrode layer, and a solid electrolyte layer that is formed by using a solid electrolyte powder produced by the method according to any one of items [1] to [6] to form an all-solid-state battery.

Advantageous Effect of the Invention

According to the present invention, a method for producing a microparticulated tin (Sn)-containing sulfide-based solid electrolyte is provided. Accordingly, a solid electrolyte layer formed by using this can reduce the interface resistance to an electrode layer.

DESCRIPTION OF EMBODIMENTS

Hereinafter, the present invention will be described in detail. Note that embodiments, etc. described below do not limit the present invention and can be modified variously within the range of the gist of the present invention.
<Method for Producing Solid Electrolyte Powder>

The present invention relates to a method for producing a solid electrolyte powder, which comprises: a step (1) for preparing a mixed solution by adding a poor solvent to a good solvent solution that comprises a good solvent and a solid electrolyte that comprises an alkali metal element and/or an alkaline earth metal element, a Sn element (Sn) and a S element (S); a step (2) for removing at least some of the good solvent from the mixed solution to precipitate solid electrolyte particles; and a step (3) for drying the solid electrolyte particles to obtain a solid electrolyte powder. In this regard, the ratio of the volume of the poor solvent relative to the volume of the good solvent (volume of poor solvent/volume of good solvent) is 5 or more.

According to the present invention, a microparticulated tin (Sn)-containing sulfide-based solid electrolyte can be produced. Specifically, a tin (Sn)-containing sulfide-based solid electrolyte (hereinafter sometimes referred to as just the "solid electrolyte") is firstly dissolved in a good solvent to obtain a good solvent solution. Next, the good solvent solution is added to a poor solvent to obtain a mixed solution (step (1)). In this regard, the ratio of the volume of the poor solvent relative to the volume of the good solvent (volume of poor solvent/volume of good solvent) is 5 or more. Further, at least some of the good solvent is removed from a mixed solvent, and since the ratio of the poor solvent contained in the mixed solvent is increased, solid electrolyte particles are precipitated (step (2)). By drying the obtained solid electrolyte particles, a solid electrolyte powder can be produced (step (3)). According to the method of the present invention, the decomposition of a solid electrolyte is not caused or hardly caused because energy of pulverization or the like is not given to the solid electrolyte. Further, since a solid electrolyte powder obtained has been microparticulated, for example, a solid electrolyte layer formed by using this reduces the interface resistance to an electrode agent. As a result, an all-solid-state battery having high-energy density and high output power can be produced. In this specification, "microparticulation" means particles or powder having an average particle diameter of 20 μm or less.

Hereinafter, each step will be described in detail.
[Step (1)]

The step (1) is a step of preparing a mixed solution by adding a poor solvent to a good solvent solution that comprises a good solvent and a solid electrolyte that comprises an alkali metal element and/or an alkaline earth metal element, a tin (Sn) element and a sulfur (S) element.
(Good Solvent Solution)

The good solvent solution comprises a good solvent and a solid electrolyte that comprises an alkali metal element and/or an alkaline earth metal element, a Sn element and a S element. In addition, publicly-known additives may be suitably added thereto.
Solid Electrolyte The solid electrolyte comprises an alkali metal element and/or an alkaline earth metal element, a Sn element and a S element. That is, the solid electrolyte is a tin (Sn)-containing sulfide-based solid electrolyte. The tin (Sn)-containing sulfide-based solid electrolyte exhibits high ionic conductivity and high water resistance.

Examples of the alkali metal element include a lithium (Li) element, a sodium (Na) element, a potassium (K) element, a rubidium (Rb) element and a cesium (Cs) element.

Examples of the alkaline earth metal element include a beryllium (Be) element, a magnesium (Mg) element, a calcium (Ca) element, a strontium (Sr) element, a barium (Ba) element and a radium (Rd) element. In this specification, the "alkaline earth metal element" includes a beryllium (Be) element and a magnesium (Mg) element.

Among the above-described examples, the alkali metal element and the alkaline earth metal element are preferably a lithium (Li) element and/or a sodium (Na) element, and more preferably a lithium (Li) element. Specifically, in one embodiment, the solid electrolyte preferably comprises at least one of a lithium (Li) element and a sodium (Na) element, and more preferably comprises a lithium (Li) element. Regarding the alkali metal element and the alkaline earth metal element, one type may be contained solely, or two or more types may be contained in combination.

The solid electrolyte may further contain other elements. Examples of said other elements include a silicon (Si) element, a germanium (Ge) element, a phosphorus (P) element, a halogen element (a fluorine (F) element, a chlorine (Cl) element, a bromine (Br) element, an iodine (I) element) and an oxygen (O) element. Note that said other elements may be contained solely, or two or more of them may be contained in combination.

Examples of the solid electrolyte include a solid electrolyte formed of a Li element, a Sn element and a S element, a solid electrolyte formed of a Na element, a Sn element and a S element, a solid electrolyte formed of a K element, a Sn element and a S element, a solid electrolyte formed of a Be element, a Sn element and a S element, a solid electrolyte formed of a Mg element, a Sn element and a S element, a solid electrolyte formed of a Ca element, a Sn element and a S element, a solid electrolyte formed of a Li element, a Sn element, a Si element and a S element, a solid electrolyte formed of a Li element, a Sn element, a P element and a S element, a solid electrolyte formed of a Li element, a Sn element, a F element and a S element, a solid electrolyte formed of a Li element, a Sn element, a Cl element and a S element, a solid electrolyte formed of a Li element, a Sn element, a Br element and a S element, a solid electrolyte formed of a Li element, a Sn element, an O element and a S element, a solid electrolyte formed of a Na element, a Sn element, a Si element and a S element, a solid electrolyte formed of a Na element, a Sn element, a P element and a S element, a solid electrolyte formed of a Na element, a Sn element, a F element and a S element, a solid electrolyte formed of a Na element, a Sn element, a Cl element and a S element, a solid electrolyte formed of a Na element, a Sn element, a Br element and a S element, a solid electrolyte formed of a Na element, a Sn element, an O element and a S element, a solid electrolyte formed of a Li element, a Sn element, a Si element, a P element and a S element, a solid electrolyte formed of a Li element, a Ge element, a Sn element, a P element and a S element, a solid electrolyte formed of a Na element, a Ge element, a Sn element, a P element and a S element, and a solid electrolyte formed of a Na element, a Sn element, a Si element, a P element and a S element. Among the above-described examples of the solid electrolyte, preferred are a solid electrolyte formed of a Li element, a Sn element and a S element, a solid electrolyte formed of a Na element, a Sn element and a S element, a solid electrolyte formed of a Li element, a Sn element, a P element and a S element, a solid electrolyte formed of a Li element, a Sn element, a Si element, a P element and a S element, a solid electrolyte formed of a Li element, a Ge element, a Sn element, a P element and a S element, a solid electrolyte formed of a Na element, a Sn element, a P element and a S element, a solid electrolyte formed of a Na element, a Ge element, a Sn element, a P element and a S element, and a solid electrolyte formed of a Na element, a Sn element, a Si element, a P element and a S element, and more preferred are a solid electrolyte formed of a Li element, a Sn element and a S element, and a solid electrolyte formed of a Na element, a Sn element and a S element. The solid electrolyte is particularly preferably a solid electrolyte formed of a Li element, a Sn element and a S element.

Specific examples of the solid electrolyte include, but are not particularly limited to, $Li_4SnS_4$, $Li_2SnS_3$, $Li_{10}SnP_2Si_2$, $Li_{9.81}Sn_{0.81}IP_{2.19}S_{12}$, $Li_{10}(Ge_{0.5}Sn_{0.5})P_2S_{12}$, $Li_{10}(Si_{0.5}Sn_{0.5})P_2Si_2$, $Li_{3.45}[Sn_{0.09}Si_{0.36}]P_{0.55}S_4$, $Na_4SnS_4$, $Na_4SnS_4$, $Na_2SnS_3$, $Na_{10}SnP_2Si_2$, $Na_{9.81}Sn_{0.81}P_{2.19}Si_2$, $Na_{10}(Ge_{0.5}Sn_{0.5})P_2SI_2$, $Na_{10}(Si_{0.5}Sn_{0.5})P_2Si_2$ and $Na_{3.45}[Sn_{0.09}Si_{0.36}]P_{0.55}S_4$. Among the above-described examples of the solid electrolyte, preferred are $Li_4SnS_4$, $Li_2SnS_3$, $Na_4SnS_4$, $Na_4SnS_4$ and $Na_2SnS_3$, and more preferred are $Li_4SnS_4$ and $Na_4SnS_4$. The solid electrolyte is even more preferably $Li_4SnS_4$. Note that it is sufficient when the above-described specific solid electrolytes have the above-described compositions, and the solid electrolytes may be constituted of a single crystal structure, or may be constituted of a combination of different crystal structures. For example, a solid electrolyte having a composition of $Li_4SnS_4$ may be constituted of a combination of $Li_4Sn_2S_6$ and $Li_2S$ with different crystal structures.

The method for producing the solid electrolyte is not particularly limited, and a publicly-known method can be suitably employed. Examples of the method include: a mechanical milling method which includes subjecting a raw material composition to mechanical milling to prepare an amorphized precursor and heating the amorphized precursor; and a liquid phase method which includes preparing a precursor in a solution, removing a solvent and heating the precursor. Among them, the mechanical milling method is preferably employed for producing the solid electrolyte.

Raw materials to be used for producing the solid electrolyte are not particularly limited, but are preferably raw materials whose constituents are selected from the group consisting of an alkali metal element, an alkaline earth metal element, a Sn element and a S element such as lithium sulfide ($Li_2S$), sodium sulfide ($Na_2S$), magnesium sulfide (MgS), strontium sulfide (SrS), elemental sulfur, tin sulfide (SnS) and tin (Sn). Among them, more preferred are raw materials whose constituents are selected from the group consisting of an alkali metal element, a Sn element and a S element such as lithium sulfide ($Li_2S$), sodium sulfide ($Na_2S$), elemental sulfur, tin sulfide (SnS) and tin (Sn).

In the case where the solid electrolyte contains other elements, raw materials containing said other elements are preferably used. Specific examples thereof include: a Si element-containing raw material such as silicon sulfide ($SiS_2$), silicon (Si) and silicon dioxide ($SiO_2$); a Ge element-containing raw material such as germanium sulfide ($GeS_2$), germanium (Ge) and germanium dioxide ($GeO_2$); a P element-containing raw material such as elemental phosphorus (P), diphosphorus trisulfide ($P_2S_3$), diphosphorus pentasulfide ($P_2S_5$), phosphorus pentachloride ($PCl_5$), phosphorus tribromide ($PBr_3$) and phosphorus pentabromide (PBrs); a halogen element-containing raw material such as lithium bromide (LiBr), sodium bromide (NaBr), lithium iodide (LiI), sodium iodide (NaI), magnesium iodide ($MgI_2$), phosphorus pentachloride ($PCl_5$), phosphorus tribromide ($PBr_3$) and phosphorus pentabromide (PBrs); and an O element-containing raw material such as lithium oxide ($Li_2O$), lithium oxide ($Na_2O$), phosphorus pentoxide ($P_2O_5$), silicon dioxide ($SiO_2$), germanium dioxide ($GeO_2$), tin (II) oxide (SnO), tin (IV) oxide ($SnO_2$) and tin (IV) oxide ($SnO_3$).

These raw materials of the solid electrolyte may be used solely, or two or more of them may be used in combination.

The content of the solid electrolyte in the good solvent solution is preferably 1 to 50% by mass, and more preferably 3 to 30% by mass relative to the total mass of the good solvent. When the content of the solid electrolyte is 1% by mass or more, it is preferred because the amount of the solvent to be used can be reduced. Meanwhile, when the content of the solid electrolyte is 50% by mass or less, it is preferred because the amount of the solid electrolyte undissolved can be reduced.

Good Solvent

The good solvent dissolves at least some of the solid electrolyte. In this specification, the "good solvent" means a solvent in which the solubility of the solid electrolyte at 25° C. is 1 mg/mL or more.

The good solvent is not particularly limited, and examples thereof include an alcohol solvent, a carboxylic acid solvent, a lactam solvent and water.

The alcohol solvent is not particularly limited, and examples thereof include methanol (boiling point: 64.7° C.), ethanol (boiling point: 78.4° C.), propanol (boiling point: 97° C.), isopropyl alcohol (boiling point: 82.5° C.) and 1-butanol (boiling point: 117.7° C.).

The carboxylic acid solvent is not particularly limited, and examples thereof include formic acid (boiling point: 100.8° C.) and acetic acid (boiling point: 118° C.).

The lactam solvent is not particularly limited, and examples thereof include N-methylpyrrolidone (NMP) (boiling point: 202° C.).

Among the above-described examples, the good solvent preferably contains the alcohol solvent, more preferably contains at least one selected from the group consisting of methanol, ethanol, propanol and isopropyl alcohol, and even more preferably contains methanol. Note that the above-described good solvents may be used solely, or two or more of them may be used in combination.

(Poor Solvent)

The poor solvent is a solvent in which the solubility of the solid electrolyte is low, and when the solid electrolyte dissolved comes into contact with the poor solvent, the solid electrolyte is precipitated. In this specification, the "poor solvent" means a solvent in which the solubility of the solid electrolyte at 25° C. is less than 1 mg/mL.

Examples of the poor solvent include an aliphatic hydrocarbon solvent, an aromatic hydrocarbon solvent, a ketone solvent, an ether solvent, an ester solvent, a nitrile solvent, a halogen solvent, an amide solvent and a sulfoxide solvent.

The aliphatic hydrocarbon solvent is not particularly limited, and examples thereof include hexane (boiling point: 69° C.), heptane (boiling point: 98.4° C.) and octane (boiling point: 125.6° C.).

The aromatic hydrocarbon solvent is not particularly limited, and examples thereof include benzene (boiling point: 80.1° C.), toluene (boiling point: 110.6° C.) and xylene (boiling point: 139° C.).

The ketone solvent is not particularly limited, and examples thereof include acetone (boiling point: 56° C.) and methyl ethyl ketone (MEK) (boiling point: 79.6° C.).

The ether solvent is not particularly limited, and examples thereof include diethyl ether (boiling point: 34.6° C.), tetrahydrofuran (THF) (boiling point: 66° C.) and 1,4-dioxane (boiling point: 101° C.).

The ester solvent is not particularly limited, and examples thereof include methyl acetate (boiling point: 57.1° C.), ethyl acetate (boiling point: 77.1° C.), propyl acetate (boiling point: 102° C.), methyl propionate (boiling point: 79.8° C.) and ethyl propionate (boiling point: 99° C.).

The nitrile solvent is not particularly limited, and examples thereof include acetonitrile (boiling point: 82° C.), isobutyronitrile (boiling point: 108° C.) and benzonitrile (boiling point: 191° C.).

The halogen solvent is not particularly limited, and examples thereof include methylene chloride (boiling point: 39.6° C.) and chloroform (boiling point: 61.2° C.).

The amide solvent is not particularly limited, and examples thereof include N,N-dimethylformamide (DMF) (boiling point: 153° C.).

Examples of the sulfoxide solvent include dimethyl sulfoxide (DMSO) (boiling point: 189° C.).

Among the above-described examples, the poor solvent preferably contains at least one of the nitrile solvent and the ester solvent, more preferably contains at least one selected from the group consisting of acetonitrile, methyl acetate, ethyl acetate, propyl acetate, methyl propionate and ethyl propionate, and even more preferably contains at least one selected from the group consisting of acetonitrile, methyl propionate and ethyl propionate. Note that the above-described poor solvents may be used solely, or two or more of them may be used in combination.

The boiling point of the poor solvent is preferably higher than the boiling point of the good solvent. When the boiling point of the poor solvent is higher than the boiling point of the good solvent, it is preferred because, for example, a heating temperature can be easily set/maintained in the step (2) which will be described later. Further, it is preferred because the rate of removal of the good solvent is higher than the rate of removal of the poor solvent at a predetermined heating temperature and this suitably causes precipitation of the solid electrolyte. The difference between the boiling point of the poor solvent and the boiling point of the good solvent (boiling point of poor solvent-boiling point of good solvent) is preferably 5° C. or more, more preferably 10° C. or more, and even more preferably 15° C. or more. The upper limit of the difference between the boiling point of the poor solvent and the boiling point of the good solvent is not particularly limited, but it is preferably 200° C. or less, more preferably 160° C. or less, and even more preferably 100° C. or less. That is, according to one embodiment, the difference between the boiling point of the poor solvent and the boiling point of the good solvent (boiling point of poor solvent–boiling point of good solvent) is preferably 10 to 200° C., more preferably 10 to 160° C., even more preferably 15 to 160° C., and particularly preferably 15 to 100° C.

The combination of the good solvent and the poor solvent is not particularly limited, and examples thereof include methanol-heptane (boiling point difference: 33.7° C.), methanol-octane (boiling point difference: 60.9° C.), methanol-benzene (boiling point difference: 15.4° C.), methanol-methyl ethyl ketone (MEK) (boiling point difference: 14.9° C.), methanol-1,4-dioxane (boiling point difference: 36.3° C.), methanol-propyl acetate (boiling point difference: 37.3° C.), methanol-methyl propionate (boiling point difference: 15.1° C.), methanol-ethyl propionate (boiling point: 34.3° C.), methanol-acetonitrile (boiling point difference: 17.3° C.), methanol-benzonitrile (boiling point difference: 126.3° C.), methanol-N,N-dimethylformamide (DMF) (boiling point difference: 88.3° C.), methanol-dimethylsulfoxide (DMSO) (boiling point difference: 124.3° C.), ethanol-heptane (boiling point difference: 20° C.), ethanol-octane (boiling point difference: 47.2° C.), ethanol-toluene (boiling point difference: 32.2° C.), ethanol-1,4-dioxane (boiling point difference: 22.6° C.), ethanol-propyl acetate (boiling point difference: 23.6° C.), ethanol-ethyl propionate (boiling point difference: 20.6° C.), ethanol-benzonitrile (boiling point difference: 112.6° C.), ethanol-N,N-dimethylformamide (DMF) (boiling point difference: 74.6° C.) and ethanol-dimethylsulfoxide (DMSO) (boiling point difference: 110.6° C.). Among the above-described examples of the combination of the good solvent and the poor solvent, preferred are methanol-1,4-dioxane (boiling point difference: 36.3° C.), methanol-propyl acetate (boiling point difference: 37.3° C.), methanol-methyl propionate (boiling point difference: 15.1° C.), methanol-ethyl propionate (boiling point: 34.3° C.), methanol-acetonitrile (boiling point difference: 17.3° C.), ethanol-1,4-dioxane (boiling point difference: 22.6° C.), ethanol-propyl acetate (boiling point difference: 23.6° C.) and ethanol-ethyl propionate (boiling point difference: 20.6° C.), and more preferred are methanol-ethyl propionate (boiling point: 34.3° C.) and methanol-acetonitrile (boiling point difference: 17.3° C.).

The ratio of the volume of the poor solvent relative to the volume of the good solvent (volume of poor solvent/volume of good solvent) is 5 or more, preferably 7.5 or more, more preferably 12.5 or more, and even more preferably 15 or more. When the volume ratio is 5 or more, it is preferred because solid electrolyte particles having a small particle diameter are precipitated in the step (2) which will be described later. Note that the upper limit of the volume ratio is not particularly limited as long as a mixed solution can be prepared, but it is preferably 50 or less, more preferably 40 or less, and even more preferably 30 or less. That is, according to one embodiment, the ratio of the volume of the poor solvent relative to the volume of the good solvent (volume of poor solvent/volume of good solvent) is preferably 7.5 to 50, more preferably 12.5 to 50, even more preferably 15 to 50, particularly preferably 15 to 40, and most preferably 15 to 30.

(Mixed Solution)

The mixed solution contains the solid electrolyte, the good solvent and the poor solvent. The mixed solution may further contain a publicly-known additive. Note that the solid electrolyte is usually dissolved in the mixed solution.

The content of the solid electrolyte in the mixed solution is preferably 0.03 to 9% by mass, and more preferably 0.1 to 5% by mass relative to the total mass of the mixed solution.

The total content of the good solvent and the poor solvent in the mixed solution is preferably 91 to 99.9% by mass, and more preferably 95 to 99.9% by mass relative to the total mass of the mixed solution.

[Step (2)]

The step (2) is a step of removing at least some of the good solvent from the mixed solution to precipitate solid electrolyte particles. Since the content ratio of the poor solvent is increased by removing at least some of the good solvent from the mixed solution, the solid electrolyte in the mixed solution is precipitated. By precipitating the solid electrolyte from the mixed solution in which the solid electrolyte is dissolved in the good solvent and the poor solvent in this way, microparticulated solid electrolyte particles can be obtained.

(Removal of Good Solvent)

The method for removing the good solvent is not particularly limited, and examples thereof include a method of heating the mixed solution, a method utilizing membrane separation such as a pervaporation method and a membrane distillation method, and a method of adsorbing the good solvent such as selective adsorption. Among them, the method for removing the good solvent is preferably a method of heating the mixed solution.

In a preferred embodiment, since the boiling point of the poor solvent is higher than the boiling point of the good solvent, by heating the mixed solution, the good solvent is relatively easily volatilized when compared to the poor solvent, and for this reason, the good solvent can be suitably removed.

Regarding the heating temperature, it is sufficient when at least some of the good solvent can be removed. Though the heating temperature varies depending on the type of the good solvent, the heating temperature is preferably a temperature that is equal to or higher than the boiling point of the good solvent and at the same time, equal to or lower than the boiling point of the poor solvent. The heating temperature is more preferably 10 to 100° C., even more preferably 20 to 80° C., and particularly preferably 40 to 60° C. When the heating temperature is within the above-described range, it is preferred because the production cost is reduced. Note that by reducing the pressure, the heating temperature can be set to a temperature that is equal to or lower than the boiling point of the good solvent.

The pressure at the time of heating is not particularly limited, but it is preferably 1500 hPa or lower, more preferably $10^{-2}$ hPa to 1024 hPa, and even more preferably 1 hPa to 300 hPa. When the pressure at the time of heating is within the above-described range, it is preferred because the temperature at the time of solvent removal can be decreased and decomposition and elution of the solid electrolyte can be suppressed.

Since the content ratio of the poor solvent is increased by removing at least some of the good solvent, the solid electrolyte in the mixed solution is precipitated. In this regard, in the step (2), the whole good solvent may be removed, or at least some of the good solvent may remain. Preferably, the whole good solvent is removed.

After the step (2), by performing filtration or the like prior to the step (3), solid electrolyte particles, and at least some of the poor solvent or at least some of the poor solvent and the good solvent can be removed.

[Step (3)]

The step (3) is a step of drying the solid electrolyte particles to obtain a solid electrolyte powder. By drying, the poor solvent, the good solvent, etc. that may remain in the solid electrolyte particles can be removed.

(Drying)

The drying temperature is not particularly limited as long as it is a temperature at which the remaining poor solvent or the remaining poor solvent and good solvent can be removed, but the drying temperature is preferably 100° C. or higher, more preferably 120 to 300° C., and even more preferably 150 to 250° C.

The pressure at the time of drying is not particularly limited, but it is preferably 500 hPa or lower, more preferably $10^{-2}$ hPa to 200 hPa, and even more preferably 1 hPa to 50 hPa. When the pressure at the time of drying is within the above-described range, it is preferred because the remaining poor solvent or the remaining poor solvent and good solvent can be sufficiently removed.

(Solid Electrolyte Powder)

Since the solid electrolyte powder has been microparticulated, for example, a solid electrolyte layer formed by using this reduces the interface resistance to an electrode agent. As a result, an all-solid-state battery having high-energy density and high output power can be produced.

The average particle diameter of the solid electrolyte powder is preferably 20 μm or less, more preferably 10 μm or less, even more preferably 5 μm or less, particularly preferably 3 μm or less, and most preferably 1.5 μm or less. From the viewpoint of handleability, the average particle diameter of the solid electrolyte powder is preferably 0.1 μm or more. In this specification, the "average particle diameter" means a median diameter ($D_{50}$) and is measured by the method described in the Examples.

<Method for Producing All-Solid-State Battery>

According to one aspect of the present invention, a method for producing an all-solid-state battery is provided. The production method comprises a step for layering a positive electrode layer, a negative electrode layer, and a solid electrolyte layer that is formed by using a solid electrolyte powder produced by the above-described method to form an all-solid-state battery. The "all-solid-state battery" means a battery in which a solid electrolyte is used as an electrolyte. The all-solid-state battery usually comprises a positive electrode layer, a solid electrolyte layer and a negative electrode layer.

The solid electrolyte layer is formed by using a solid electrolyte powder produced by the above-described method. In this regard, the solid electrolyte layer may be produced by using only the solid electrolyte powder, or may be produced by additionally using another solid electrolyte in combination. Examples of said another solid electrolyte include a tin-containing sulfide-based solid electrolyte produced by another method, a tin-free sulfide-based solid electrolyte, an oxide-based solid electrolyte and a complex hydride solid electrolyte. As said another solid electrolyte, these materials may be used solely, or two or more of them may be used in combination.

Since the solid electrolyte powder produced by the above-described method is a tin (Sn)-containing sulfide-based solid electrolyte, a solid electrolyte layer obtained can exhibit high ionic conductivity and high water resistance. Further, since the solid electrolyte powder produced by the above-described method has been microparticulated, a solid electrolyte layer obtained reduces the interface resistance to an electrode agent and contributes to obtaining high-energy density and high output power of the all-solid-state battery.

Further, the positive electrode layer and/or the negative electrode layer may be formed by using the solid electrolyte powder produced by the above-described method. In the case where the positive electrode layer or negative electrode layer is produced by using the solid electrolyte powder, it is used in combination with a publicly-known positive electrode active material or negative electrode active material for lithium ion secondary batteries to form the positive electrode layer or negative electrode layer. In this regard, the quantitative ratio of the solid electrolyte powder to be contained in the positive electrode layer or negative electrode layer is not particularly limited. Note that the positive electrode layer and the negative electrode layer may contain a publicly-known current collector, conduction assisting agent, binder, etc.

The all-solid-state battery is prepared by forming and laminating the above-described positive electrode layer, solid electrolyte layer and negative electrode layer, and the forming method and laminating method for the respective layers are not particularly limited.

Examples thereof include: a method in which a solid electrolyte and/or an electrode active material are dispersed in a solvent to provide a slurry-like mixture, which is applied by a doctor blade, spin coating or the like and subjected to rolling to form a film; a gas phase method in which film forming and lamination are performed by using a vacuum deposition method, ion plating method, sputtering method, laser ablation method or the like; and a pressing method in which powder is formed by hot pressing or cold pressing (not heating) and laminated.

Since the solid electrolyte powder produced by the above-described method is a tin-containing sulfide-based solid electrolyte powder and is relatively soft, it is particularly preferred to prepare the all-solid-state battery by forming the respective layers by means of the pressing method and laminating the layers. As the pressing method, there are hot pressing in which heating is performed and cold pressing in which heating is not performed, but forming the layers can be sufficiently carried out even by means of cold pressing.

EXAMPLES

Hereinafter, the present invention will be more specifically described by way of examples, but the present invention is not limited to the examples.

Production Example

A solid electrolyte having a composition of $Li_4SnS_4$ was produced by the method described below.

In a glovebox under argon atmosphere, $Li_2S$ (purity: 99.8%, manufactured by Sigma-Aldrich) and $SnS_2$ (purity: 99.9%, manufactured by Kojundo Chemical Laboratory Co., Ltd.) were weighed so as to provide the stoichiometric ratio of $Li_4SnS_4$, and mixing was carried out for 15 minutes using an agate mortar. 1.0 g of the obtained mixture and 15 zirconia balls (outer diameter (p: 10 mm) were put into a 45-mL zirconia pot, and the pot was sealed. The zirconia pot was fixed to a planetary ball mill (manufactured by Fritsch Japan Co., Ltd.), and the ball mill treatment was carried out at 370 rpm for 4 hours. The obtained precursor was calcined at 450° C. for 8 hours, thereby producing a solid electrolyte having a composition of $Li_4SnS_4$.

Example 1

(Preparation of Good Solvent Solution)

In a glovebox under argon atmosphere, 500 mg of $Li_4SnS_4$ was added to 5 mL of methanol (super dehydrated grade, boiling point: 64° C., manufactured by FUJIFILM Wako Pure Chemical Corporation) as a good solvent, and mixing was carried out at room temperature (25° C.) for 24 hours. Note that $Li_4SnS_4$ was gradually dissolved. Insoluble matters derived from the production process of $Li_4SnS_4$ contained in the obtained solution were filtered using a membrane filter (polytetrafluoroethylene (PTFE), pore size: 1.0 μm), thereby obtaining a good solvent solution in which $Li_4SnS_4$ was dissolved. The concentration of $Li_4SnS_4$ in the good solvent solution was 13% by mass.

(Step (1))

50 mL of acetonitrile as a poor solvent was added to the good solvent solution, and mixing was carried out to prepare a mixed solution.

(Step (2))

The mixed solution was heated at 50° C. under reduced pressure (200 hPa) to precipitate $Li_4SnS_4$ particles. Note that a part of methanol and acetonitrile was volatilized by heating, and with this volatilization, $Li_4SnS_4$ particles were precipitated.

(Step (3))

The solution in which the $Li_4SnS_4$ particles were precipitated was continuously heated at 50° C. under reduced pressure (100 hPa) while stirring to remove the solvent. Next, the $Li_4SnS_4$ particles were dried under vacuum (1 hPa) at 180° C. for 4 hours to remove the solvent that was coordinated with the $Li_4SnS_4$ particles, thereby producing a $Li_4SnS_4$ powder.

The average particle diameter of the obtained $Li_4SnS_4$ powder was measured by the method described below.

A small amount of the $Li_4SnS_4$ powder was sampled, the powder was added to acetonitrile as a dispersion medium, and dispersion was carried out for 3 minutes using an ultrasonic homogenizer (UH-50 manufactured by SMT Co., Ltd.). Subsequently, the particle size distribution was measured using a laser scattering/diffraction type particle size distribution measuring apparatus (Misrotrac MT3000EXII manufactured by Nikkiso Co., Ltd.) to determine the average particle diameter ($D_{50}$).

The result showed that the average particle diameter ($D_{50}$) of the $Li_4SnS_4$ powder was 1.7 μm.

Example 2

A $Li_4SnS_4$ powder was produced in a manner similar to that in Example 1, except that the amount of acetonitrile was changed to 25 mL. The average particle diameter ($D_{50}$) of the $Li_4SnS_4$ powder was measured in a manner similar to that in Example 1, and it was 4 μm.

Example 3

A $Li_4SnS_4$ powder was produced in a manner similar to that in Example 1, except that the amount of acetonitrile was changed to 100 mL. The average particle diameter ($D_{50}$) of the $Li_4SnS_4$ powder was measured in a manner similar to that in Example 1, and it was 1.1 μm.

Example 4

A $Li_4SnS_4$ powder was produced in a manner similar to that in Example 1, except that 50 mL of ethyl propionate was used instead of acetonitrile. The average particle diameter ($D_{50}$) of the $Li_4SnS_4$ powder was measured in a manner similar to that in Example 1, and it was 1.7 μm.

Comparative Example 1

A $Li_4SnS_4$ powder was produced in a manner similar to that in Example 1, except that a good solvent solution was not added to acetonitrile. The average particle diameter ($D_{50}$) of the $Li_4SnS_4$ powder was measured in a manner similar to that in Example 1, and it was 24 μm.

The results obtained in Examples 1 to 4 and Comparative Example 1 are shown in Table 1 below.

TABLE 1

| | Good Solvent | | Poor Solvent | | Volume Ratio of | |
| --- | --- | --- | --- | --- | --- | --- |
| | Concentration of $Li_4SnS_4$ (% by mass) | Amount of Solvent (mL) | Type | Amount of Solvent (mL) | Good Solvent/ Poor Solvent | Average Particle Diameter of $Li_4SnS_4$ Powder (μm) |
| Example 1 | 13 | 5 | Acetonitrile | 50 | 10 | 1.7 |
| Example 2 | 13 | 5 | Acetonitrile | 25 | 5 | 4.0 |
| Example 3 | 13 | 5 | Acetonitrile | 100 | 20 | 1.1 |
| Example 4 | 13 | 5 | Ethyl Propionate | 50 | 10 | 1.7 |
| Comparative Example 1 | 13 | 5 | — | — | — | 24 |

It is understood from the results in Table 1 that the $Li_4SnS_4$ powders produced according to the methods of Examples 1 to 4 have been microparticulated.

The invention claimed is:

1. A method for producing a solid electrolyte powder, which comprises:
   preparing a mixed solution by adding a poor solvent to a good solvent solution that comprises a good solvent and a solid electrolyte that comprises an alkali metal element and/or an alkaline earth metal element, Sn and S;
   removing at least some of the good solvent from the mixed solution to precipitate solid electrolyte particles; and
   drying the solid electrolyte particles to obtain a solid electrolyte powder,
   wherein the ratio of the volume of the poor solvent relative to the volume of the good solvent (volume of poor solvent/volume of good solvent) is 5 or more.

2. The method according to claim 1, wherein the solid electrolyte comprises at least one of Li and Na.

3. The method according to claim 1, wherein the solid electrolyte is a solid electrolyte formed of Li, Sn and S.

4. The method according to claim 3, wherein the good solvent comprises an alcohol solvent.

5. The method according to claim 4, wherein the poor solvent comprises at least one of nitrile solvents and ester solvents.

6. The method according to claim 3, wherein the poor solvent comprises at least one of nitrile solvents and ester solvents.

7. The method according to claim 1, wherein the good solvent comprises an alcohol solvent.

8. The method according to claim 7, wherein the poor solvent comprises at least one of nitrile solvents and ester solvents.

9. The method according to claim 1, wherein the poor solvent comprises at least one of nitrile solvents and ester solvents.

10. The method according to claim 1 wherein the solid electrolyte powder has an average particle diameter of 20 μm or less.

11. A method for producing an all-solid-state battery, which comprises:
    preparing a mixed solution by adding a poor solvent to a good solvent solution that comprises a good solvent and a solid electrolyte that comprises an alkali metal element and/or an alkaline earth metal element, Sn and S;
    removing at least some of the good solvent from the mixed solution to precipitate solid electrolyte particles;
    drying the solid electrolyte particles to obtain a dried solid electrolyte powder,
    wherein the ratio of the volume of the poor solvent relative to the volume of the good solvent (volume of poor solvent/volume of good solvent) is 5 or more;
    forming a solid electrolyte layer from the dried solid electrolyte powder; and
    layering a positive electrode layer, a negative electrode layer, and the solid electrolyte layer to form the all-solid-state battery.

12. The method of claim 11, wherein the solid electrolyte is a solid electrolyte formed of Li, Sn and S.

13. The method of claim 11, wherein the poor solvent comprises at least one of nitrile solvents and ester solvents.

14. The method of claim 11, wherein the good solvent comprises an alcohol solvent and the poor solvent comprises at least one of nitrile solvents and ester solvents.

* * * * *